(12) United States Patent
Chandramouli et al.

(10) Patent No.: US 12,432,546 B2
(45) Date of Patent: Sep. 30, 2025

(54) DYNAMICALLY UNSUBSCRIBING FROM A PLMN/NPN SERVICE

(71) Applicant: NOKIA TECHNOLOGIES OY, Espoo (FI)

(72) Inventors: Devaki Chandramouli, Plano, TX (US); Nagendra S. Bykampadi, Bangalore (IN); Saurabh Khare, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 593 days.

(21) Appl. No.: 17/772,006

(22) PCT Filed: Sep. 15, 2020

(86) PCT No.: PCT/FI2020/050587
§ 371 (c)(1),
(2) Date: Apr. 26, 2022

(87) PCT Pub. No.: WO2021/089905
PCT Pub. Date: May 14, 2021

(65) Prior Publication Data
US 2022/0377528 A1 Nov. 24, 2022

Related U.S. Application Data

(60) Provisional application No. 62/929,977, filed on Nov. 4, 2019.

(51) Int. Cl.
*H04W 8/18* (2009.01)
*H04W 60/06* (2009.01)
(52) U.S. Cl.
CPC ............ *H04W 8/18* (2013.01); *H04W 60/06* (2013.01)

(58) Field of Classification Search
CPC ......... H04W 8/18; H04W 60/06; H04W 8/24; H04W 60/00; H04W 4/60
See application file for complete search history.

(56) References Cited

U.S. PATENT DOCUMENTS

2009/0063650 A1* 3/2009 Anslow ............... H04L 41/0853
709/208
2010/0322213 A1* 12/2010 Liu ......................... H04L 67/51
370/338

(Continued)

FOREIGN PATENT DOCUMENTS

WO WO-2008049368 A1 * 5/2008 ............ H04L 63/08
WO WO-2017220155 A1 * 12/2017 ............ H04W 12/35

(Continued)

OTHER PUBLICATIONS

International Search Report and Written Opinion dated Dec. 15, 2020 corresponding to International Patent Application No. PCT/FI2020/050587.

(Continued)

*Primary Examiner* — Marisol Figueroa
(74) *Attorney, Agent, or Firm* — SQUIRE PATTON BOGGS (US) LLP

(57) ABSTRACT

Systems, methods, apparatuses, and computer program products for dynamically unsubscribing from a public land mobile network (PLMN)/non-private network (NPN) service. In example embodiments, a method is provided. The method comprises transmitting, by a user equipment (UE), at least one first message (112, 114) associated with registering with at least one network, wherein the at least one first message (112, 114) includes first information that indicates whether the user equipment (UE) is capable of unsubscribing from one or more services associated with the at least one network; and receiving, by the user equipment (UE), at least one second message (124) associated with accepting (Continued)

registration of the user equipment (UE) with the at least one network, wherein the at least one second message (124) includes second information that indicates whether the user equipment (UE) is allowed to unsubscribe from the one or more services.

20 Claims, 14 Drawing Sheets

(56) References Cited

U.S. PATENT DOCUMENTS

| | | | | |
|---|---|---|---|---|
| 2014/0128065 A1* | 5/2014 | Motohashi | ............ | H04W 60/00 455/435.1 |
| 2015/0350870 A1 | 12/2015 | Horn et al. | | |
| 2016/0374134 A1 | 12/2016 | Kweon et al. | | |
| 2019/0159158 A1* | 5/2019 | Kang | ................. | H04W 60/005 |
| 2019/0261260 A1 | 8/2019 | Dao et al. | | |
| 2022/0303934 A1* | 9/2022 | Ianev | ................... | H04W 60/06 |

FOREIGN PATENT DOCUMENTS

| | | |
|---|---|---|
| WO | 2018/199668 A1 | 11/2018 |
| WO | WO-2021006090 A1 * | 1/2021 ............ H04W 24/02 |

OTHER PUBLICATIONS

3GPP TS 23.502 V16.2.0 (Sep. 2019), Technical Specification, 3rd Generation Partnership Project; Technical Specification Group Services and System Aspects; Procedures for the 5G System (5GS); Stage 2 (Release 16), Sep. 2019.

3GPP TS 23.501 V16.2.0 (Sep. 2019), Technical Specification, 3rd Generation Partnership Project; Technical Specification Group Services and System Aspects; System Architecture for the 5G System (5GS); Stage 2 (Release 16), Sep. 2019.

* cited by examiner

DYNAMICALLY UNSUBSCRIBING FROM A PLMN/NPN SERVICE

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for dynamically unsubscribing from a public land mobile network (PLMN)/non-public network (NPN) service.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein.

DETAILED DESCRIPTION

Figure 1:
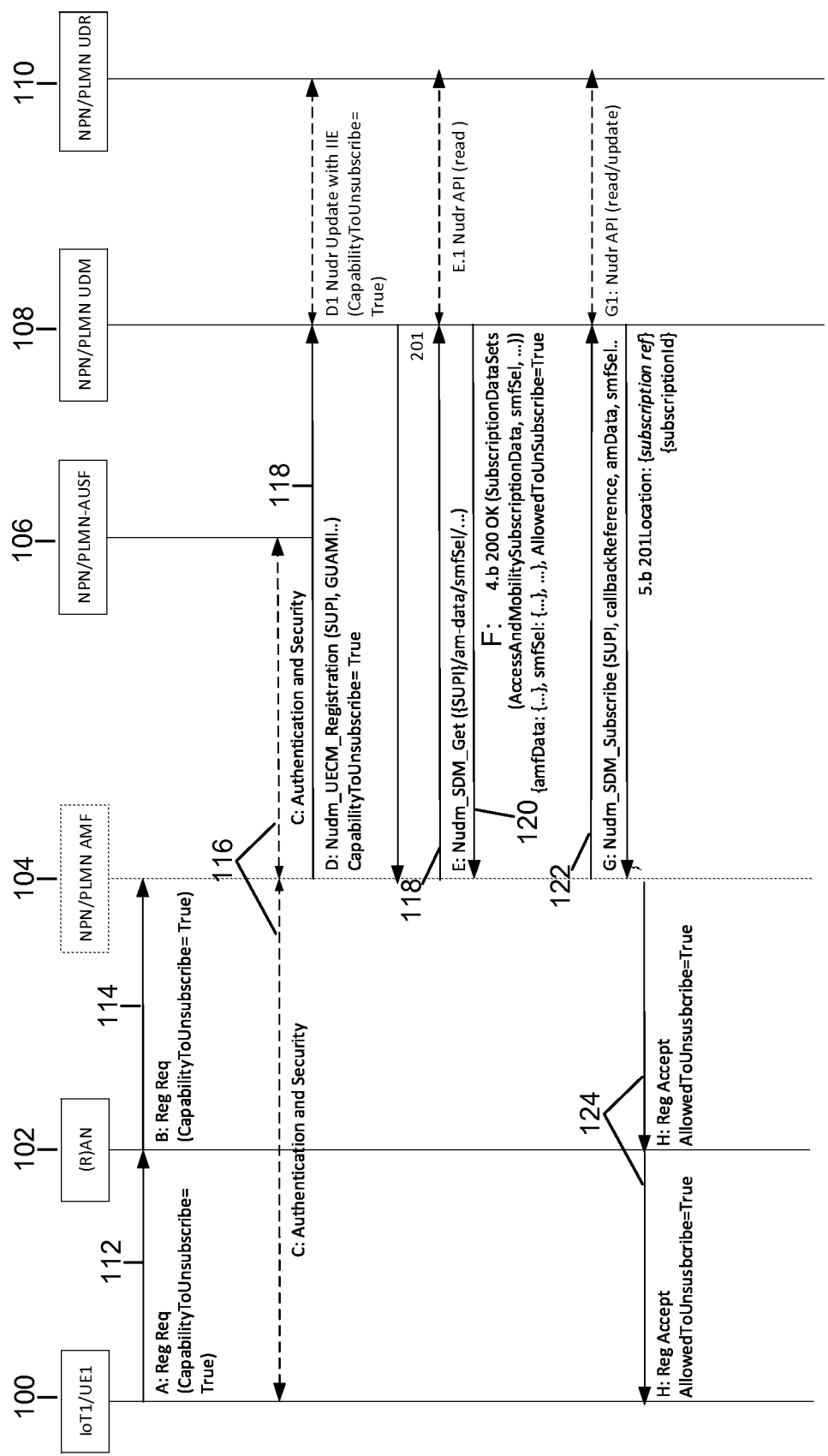
FIG. 1 illustrates an example signal diagram of a registration process for registering a user equipment (UE) with a PLMN/NPN, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for dynamically unsubscribing from a PLMN/NPN is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

With introduction of NR deployment in unlicensed spectrum (NR-U) and standalone NPN (or PLMN) (as used herein, the phrases "PLMN/NPN" and "NPN/PLMN" are interchangeable and may refer to a PLMN individually, an NPN individually, or a network that is a combination of a PLMN and a NPN), NR-U deployment in small enterprises may be utilized for local area network (LAN) service support (e.g., at airports, hotels, apartment buildings, college campuses, etc.). In such deployments, supporting the ability to dynamically unsubscribe a subscription from the network (e.g., a subscription for one or more services provided by the network) may have to be implemented. However, there is currently no option available for a UE to unsubscribe from PLMN/NPN services (or credentials). For example, there is no option available for a UE to inform a network (e.g., a PLMN or a NPN) that it has determined to unsubscribe from an operator's services. Some networks may utilize captive portals for dynamic subscription, however, there may be no option available for a UE to unsubscribe a set of credentials or a PLMN/NPN service, or there may be no redirection to an unsubscribe procedure.

Some embodiments described herein may provide a way for a UE to unsubscribe from a network's services (e.g., from services provided by a PLMN and/or a NPN). For example, some embodiments described herein provide a way for a UE to dynamically unsubscribe from a PLMN/NPN service in certain areas (e.g., in areas where NR-U is deployed, such as a certain location).

There may be one or more possible options for a UE to unsubscribe. In a first option (e.g., a captive portal-based unsubscribe), a network may redirect the UE to a captive portal based on an unsubscribe request in a network access stratum (NAS) deregistration request message. Based on subscription data, if the UE is allowed to unsubscribe, an access management function (AMF) node may redirect the UE to a captive portal when the UE requests to unsubscribe. The captive portal may provide different options to the UE based on a subscription of the UE (e.g., options requesting payment of a remaining amount for a service, requesting a one-time fee, requesting a user of the UE to connect to a customer care center, and/or the like). Additionally, or alternatively, the captive portal may unsubscribe the UE via a customer relationship management (CRM) system, or via different means, after checking the subscription details.

If the UE is unsubscribed successfully, the captive portal may send a positive acknowledgement to the AMF node, and the AMF node may perform a deregistration procedure by communicating with a unified data management (UDM) node and/or one or more other network functions (NFs). The AMF node may also send a deregistration accept message to the UE, where the message may comprise an information element (IE) configured with a value to indicate that the UE has been unsubscribed (e.g., an IE associated with unsubscribing from a PLMN/NPN that may be configured with a "true" value to indicate that the UE has been unsubscribed).

In a second option (e.g., a direct unsubscribe), an AMF node may send a deregistration request message to a UDM node that comprises an IE associated with indicating whether an unsubscribe has been requested from a PLMN/NPN (e.g., where a particular value, such as a "true" value, indicates that the unsubscribe has been requested by the UE). Based on subscription data, the UDM node may accept the request or may reject it. If the request is allowed, then the UDM node may unsubscribe the UE directly by purging subscription information associated with the subscription of the UE and the UDM node may send a deregistration confirmation, which comprises an indication that the unsubscribe has been requested, towards the AMF node. The AMF node may also send a deregistration accept message to the UE that comprises an indication that the unsubscribe has been completed (e.g., an IE that includes a value indicating that the unsubscribe has been completed).

For both of the above example options, if the UE is attached in another domain (e.g., a mobility management entity (MME), a serving general packet radio service (GPRS) support node (SGSN), and/or the like), a UDM node may send a message (e.g., a home subscriber service (HSS)-unified data management (UDM) interface message via a HSS-UDM interface) to a home subscriber service (HSS) node to deregister the UE in the one or more other domains if the subscription is common to the domain currently being deregistered and the one or more other domains.

The UE may indicate a capability to support unsubscribe as part of a registration procedure, described elsewhere herein. For example, the UE may have the capability to send an unsubscribe request. In this case, the UE may indicate the capability in an information element (IE) in a registration message (e.g., a CapabilityToUnsubscribe IE in a network access stratum (NAS) REGISTRATION_REQ message).

An AMF node may provide the same indication to the UDM node via registration operations, and if, based on operator policy and/or subscription details, the UE is allowed to unsubscribe dynamically, the UDM node may provide subscription data with an indication that the UE is allowed to dynamically unsubscribe (e.g., a DynamicUnsubscibeAllowed IE that comprises a value of "True" to indicate that the UE is permitted to dynamically unsubscribe). The AMF node may provide the same indication to the UE via a registration accept message (e.g., a NAS REGISTRATION_ACCEPT message). When the UE determines to unsubscribe from the one or more PLMN/NPN services, the UE may initiate the unsubscribe operations with a deregistration request (e.g., a NAS DEERGISTRATION_REQ) that comprises an IE that indicates that the unsubscribe has been requested (e.g., an Unsubscribe_PLMN/NPN_Requested IE that comprises a value of "True" to indicate that the unsubscribe has been requested).

This facilitates a UE (e.g., an Internet of Things (IoT) device) to unsubscribe from one or more services dynamically based on satisfaction of a condition. For example, the UE may unsubscribe from a PLMN/NPN service based on a remaining battery life of the UE satisfying a threshold, based on completing a task assigned to the UE, based on being provided the option to unsubscribe from the network (e.g., periodically, according to a schedule, etc.), and/or the like. In this way, certain embodiments conserve computing resources, processor resources, and/or battery resources of a UE and/or a network node by reducing or eliminating subscription-related signaling after satisfaction of one or more conditions. To avoid a denial of service (DoS) attack (e.g., repeated and frequent attempts to dynamically subscribe and unsubscribe from one or more services), a UE may be barred from subscribing to a service for a period of time (e.g., between one hour and 24 hours) after a dynamic unsubscribe process is complete. In this way, certain embodiments described herein prevent waste and/or excessive consumption of computing resources that would otherwise occur if the certain embodiments were not configured to avoid DoS attacks.

FIG. 1 illustrates an example signal diagram of a registration process for registering a user equipment (UE) with a PLMN/NPN, according to some embodiments. FIG. 1 illustrates a UE 100 (shown as "IoT1/UE1"), a radio access network (RAN) node 102 (shown as "(R)AN)"), an AMF node 104 associated with a PLMN/NPN (shown as "NPN/PLMN AMF"), an authentication server function (AUSF) node 106 associated with the NPN/PLMN (shown as "NPN/PLMN-AUSF"), a UDM node 108 associated with the PLMN/NPN (shown as "NPN/PLMN UDM"), and a user data repository (UDR) node 110 associated with the PLMN/NPN (shown as "NPN/PLMN UDR"). In addition, FIG. 1 illustrates various operations of the previously listed devices and/or nodes.

As illustrated at 112, 114 (operations A, B, respectively), when the UE 100 determines to connect to a PLMN and/or NPN network, it may initiate a registration request (e.g., a NAS registration request). The UE 100 may include an IE, or a value for an IE, that indicates a capability of the UE to unsubscribe from credentials and/or services of the PLMN and/or the NPN. If the UE 100 does not support this mechanism of unsubscribing, then the UE 100 may not include the IE, or may include a different value for an IE, in the NAS signaling.

As illustrated at 116 (operation C), various devices and/or nodes may communicate to perform authentication and/or security processes. For example, the UE 100 and the AMF node 104 may communicate with each other, and the AMF node 104 and the AUSF node 106 may communicate with each other. As illustrated at 118 (operation D), the AMF node 104 may perform a registration procedure with the UDM node 108 via an application programming interface (API) (e.g., a Nudm_UECM_Registration API). The AMF node 104 may include the IE, or value for the IE, described above, and may provide the same to the UDM node 108. The UDM node 108 may store the same in the UDR node 110 over an interface (e.g., a Nudr interface). "Nudm" may refer to one or more APIs exposed by the UDM node 108. "Nudr" may refer to one or more APIs exposed by the UDR node 110.

As illustrated at 118, 120, 122, and 124 (operations E, F, G, and H, respectively), after successful registration, the AMF node 104 may retrieve data from the UDM node 108 and may subscribe a data change notification for the retrieved data set. In the subscription data, the UDM node 108 and/or the UDR node 110 may include a subscription level flag to indicate whether the UE 100 is allowed to unsubscribe from one or more services (e.g., shown as an AllowedToUnsubscribe IE with a value of "True" to indicate that the UE 100 is allowed to unsubscribe). A message indicating acceptance of the registration of the UE 100 (e.g., a REGISTRATION ACCEPT message) may be sent to the UE 100, where the message comprises the subscription level flag (e.g., the AllowedToUnsubscribe IE with a value of "True" to indicate that the UE 100 is allowed to unsubscribe). This indication may cause the UE 100 to operate in a particular manner. For example, if the value of the AllowedToUnsubscribe IE is "True," then the UE 100 may be allowed to send an unsubscribe request, and may send the unsubscribe request at a future time after determining to unsubscribe. Otherwise, the UE 100 may not be allowed to send the unsubscribe request, and may determine to not send an unsubscribe request at a future time.

As described above, FIG. 1 is provided as an example. Other examples are possible, according to some embodiments.

Figure 2:
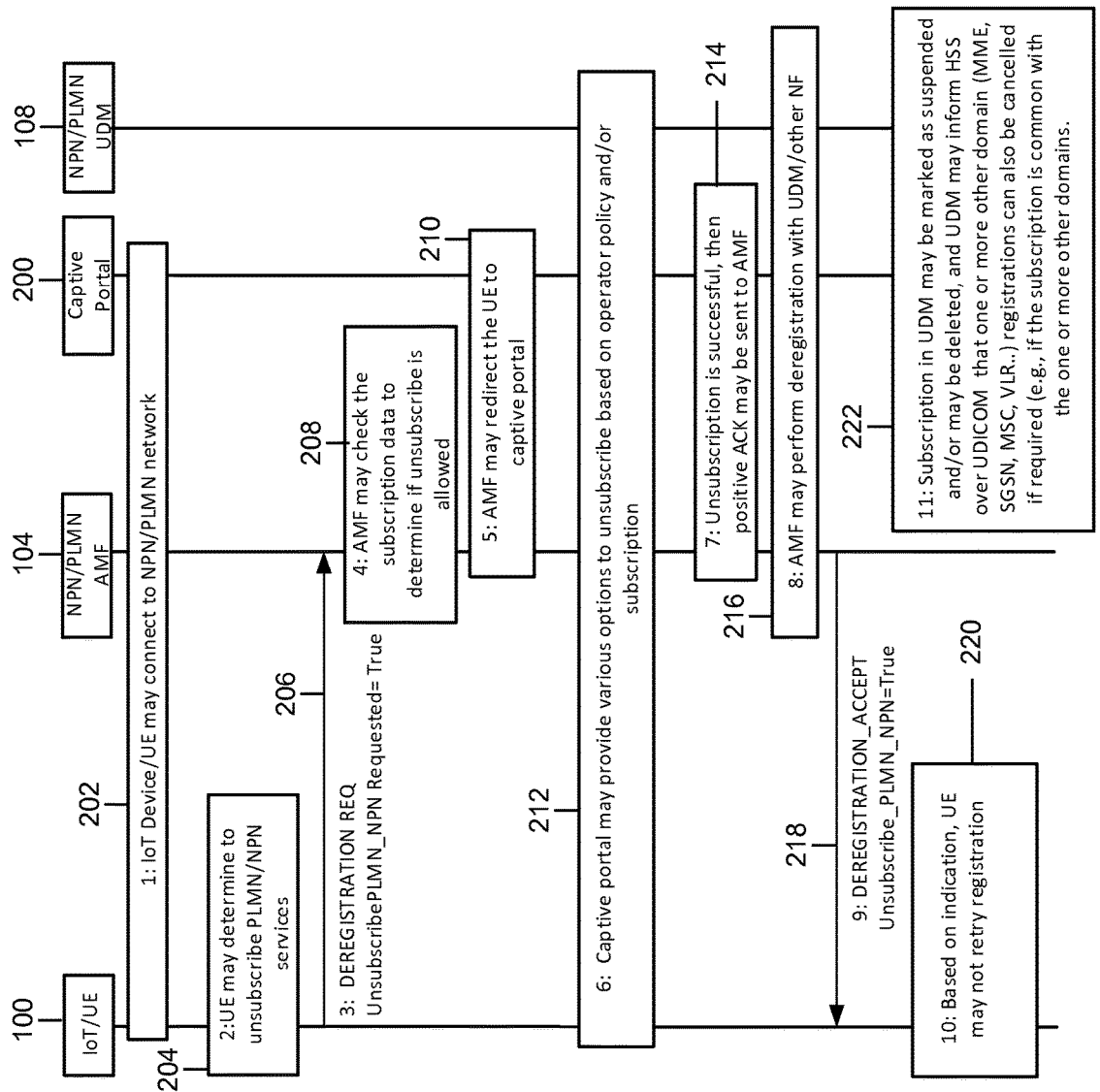
FIG. 2 illustrates an example signal diagram of a captive portal-based unsubscribe process for a UE, according to some embodiments.

FIG. 2 illustrates an example signal diagram of a captive portal-based unsubscribe process for a UE, according to some embodiments. For example, FIG. 2 illustrates certain embodiments related to the first unsubscribe option described above. FIG. 2 illustrates the UE 100, the AMF node 104, the UDM node 108, and a captive portal 200 associated with the PLMN/NPN network.

As illustrated at 202, the UE 100 may connect to (or already be connected to) the PLMN/NPN. For example, the UE 100 may connect to the PLMN/NPN in the manner described above with respect to FIG. 1. As illustrated at 204, the UE 100 may determine to unsubscribe from one or more PLMN/NPN services due to one or more conditions being satisfied (e.g., based on a remaining battery life of the UE 100 satisfying a threshold, based on the UE 100 determining, or receiving an indication, that the UE 100 has completed an assigned task, and/or the like, as described elsewhere herein).

As illustrated at 206, the UE 100 may provide a deregistration request message to the AMF node 104, where the deregistration request message may include information that indicates that the UE 100 is requesting to unsubscribe from the one or more services. For example, the UE 100 may provide a NAS DEREGISTRATION_REQ message that comprises an UNSUBSCRIBE_PLMN/NPN_REQUESTED IE that includes a value of "TRUE" to indicate that the UE 100 has requested to unsubscribe.

As illustrated at 208, 210, based on receiving the deregistration request, the AMF node 104 may check subscription data to determine if the subscription of the UE 100 allows the UE 100 to unsubscribe from the one or more services. If the UE 100 is allowed to unsubscribe, the AMF node 108 may redirect the UE to the captive portal 200. As illustrated at 212, if the UE 100 is allowed to unsubscribe, then the captive portal 200 may provide one or more options to the UE 100 (e.g., for display, for selection by the UE 100 based on a setting, and/or the like) for unsubscribing from the one or more services. The one or more options may be based on the subscription of the UE 100, an operator policy of an operator of the PLMN/NPN, and/or the like. The one or more options may comprise requesting a user of the UE 100 to pay an additional fee for unsubscribing immediately, requesting a user of the UE 100 to visit one or more locations associated with the operator, requesting the user of the UE 100 to contact a customer care center, and/or the like. Additionally, or alternatively, the captive portal 200 may update subscription data stored by a CRM system to delete or suspend the subscription and/or to indicate that the UE 100's subscription has been suspended or deleted.

As illustrated at 214, if the un-subscription is performed successfully, then the captive portal 200 may send a positive acknowledgement (ACK) to the AMF node 104. As illustrated at 216, the AMF node 104 may perform a deregistration of the UE 100 with the UDM node 108. The AMF node 104 may provide a deregistration accept message to the UE 100, where the deregistration accept message may comprise information that indicates that the UE 100 has been unsubscribed from the one or more services. For example, the AMF node 104 may send a DEREGISTRATION_ACCEPT message to the UE 100, where the DEREGISTRATION_ACCEPT message comprises an UNSUBSCRIBE_PLMN/NPN IE that includes a value of "TRUE" to indicate that the UE 100 has been unsubscribed from the one or more services.

As illustrated at 220, based on the indication received at 218, the UE 100 may optimize handling and may not retry registration to the PLMN/NPN and/or subscription to the one or more services (e.g., for a period of time). As illustrated at 222, one or more nodes may mark the subscription stored in the UDM node 108 as suspended and/or the subscription may be deleted, and the UDM node 108 may send a message (e.g., a HSS-UDM interface message via a HSS-UDM interface) to the HSS to inform the HSS of the suspension and/or deletion of the subscription. Additionally, or alternatively, the UDM node 108 may inform the HSS that one or more other domain registrations may also be canceled (e.g., suspended and/or deleted) if the subscription of the current domain is common across the one or more other domains. The HSS may deregister the UE in one or more other domains based on receiving the above described indication, if the subscription for the UE 100 is common with the one or more other domains. In some embodiments, this functionality may also be controlled via a CRM system, where the CRM system can directly update the HSS and/or the UDM node 108.

As indicated above, FIG. 2 is provided as an example. Other examples are possible, according to some embodiments.

Figure 3:
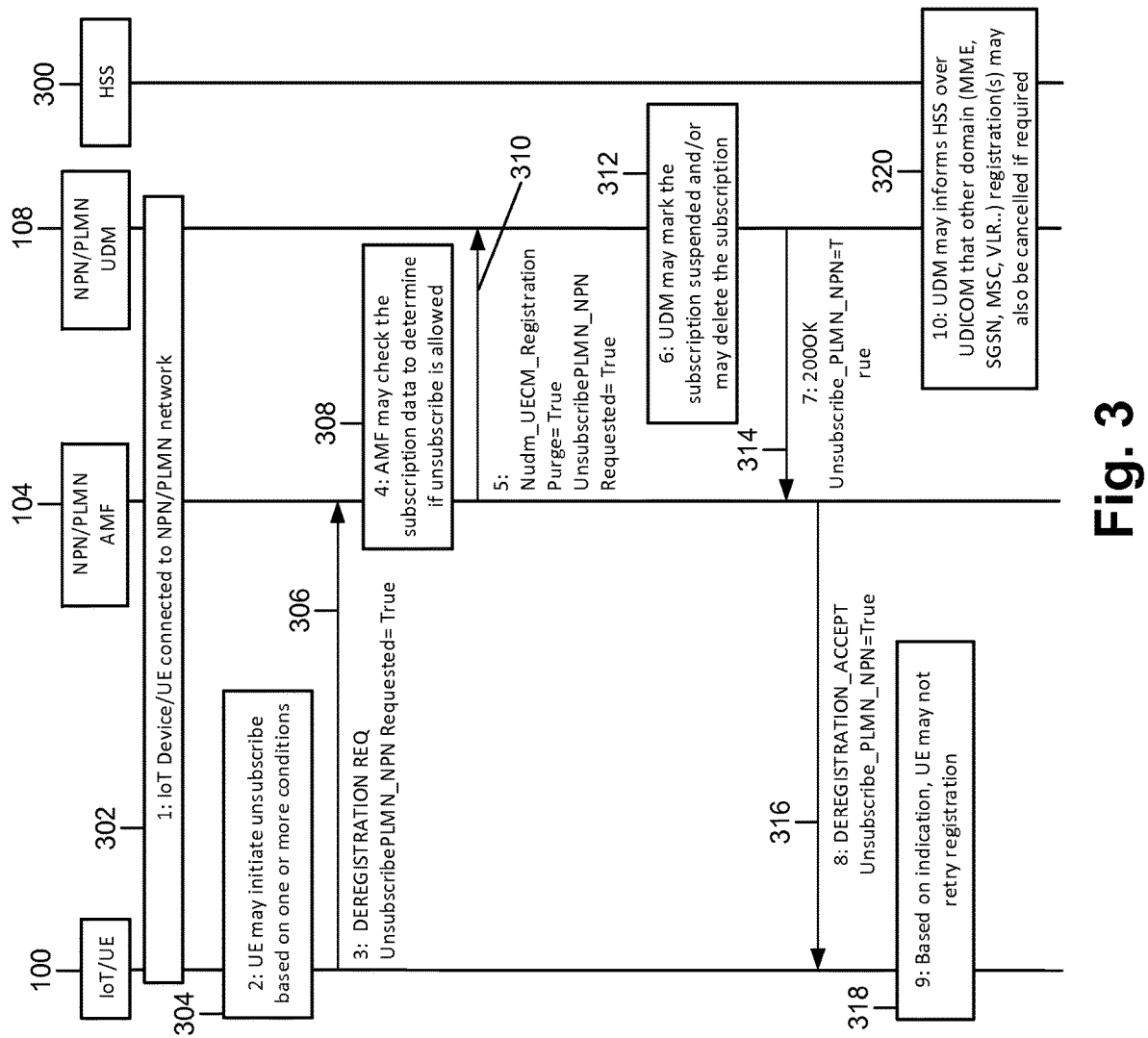
FIG. 3 illustrates an example signal diagram of a direct unsubscribe process for a UE, according to some embodiments.

FIG. 3 illustrates an example signal diagram of a direct unsubscribe process for a UE, according to some embodiments. For example, FIG. 3 illustrates certain embodiments related to the second unsubscribe option described above. FIG. 3 illustrates the UE 100, the AMF node 104, the UDM node 108, and an HSS 300 associated with the PLMN/NPN.

As illustrated at 302, the UE 100 may connect (or already be connected) to the PLMN/NPN. For example, the UE 100 may have connected to the PLMN/NPN in a manner similar to that described above with respect to FIG. 1. As illustrated at 304, the UE 100 may initiate an unsubscribe from one or more services provided by the PLMN/NPN based on satisfaction of one or more conditions.

As illustrated at 306, the UE 100 may send a deregistration request message to the AMF node 104, where the deregistration request message may include information that indicates that the UE 100 has requested to unsubscribe from one or more services provided by the PLMN/NPN. For example, the UE 100 may transmit a NAS DEREGISTRATION_REQ message that includes an UNSUBSCRIBE_PLMN/NPN_REQUESTED IE, where the value of the IE is "TRUE" to indicate that the UE 100 has requested to unsubscribe from the one or more services.

As illustrated at 308, upon receiving the request, the AMF node 104 may check the subscription data associated with the UE 100 to determine if the UE 100 is allowed to unsubscribe or not from the one or more services. If the UE 100 is allowed to unsubscribe, then, as illustrated at 310, the AMF node may send a deregistration request to the UDM node 108. For example, the UE 100 may send a Nudm_UECM_Registration request with a purge-related IE having a value of "True" to indicate that the registration of the UE 100 is to be suspended and/or deleted (e.g., that the UE 100 is to be deregistered from the PLMN/NPN). The deregistration request message may include information that indicates that the UE 100 has requested to unsubscribe from the one or more services. For example, the deregistration request may comprise an UNSUBSCRIBE_PLMN/NPN_REQUESTED IE that includes a value of "TRUE" to indicate that the unsubscribe has been requested.

As illustrated at 312, based on the subscription of the UE 100, if the UE 100 is allowed to unsubscribe dynamically, the UDM node 108 may mark the subscription as suspended (or deleted), or may delete the subscription for the UE 100. As illustrated at 314, the UDM node 108 may send a response message to AMF node 104. For example, the UDM node 108 may send a 200 OK message to the AMF node 108. The response message may include information that indicates that that the UE 100 has been unsubscribed from one or more services. For example, the response message may include an UNSUBSCRIBE_PLMN/NPN IE that includes a value of "TRUE" to indicate that the UE 100 has been unsubscribed.

As illustrated at 316, if the unsubscribe is performed successfully, then the AMF node 104 may send a deregistration accept message to the UE 100, where the deregistration accept message may include information indicating that the UE 100 has been unsubscribed. For example, the AMF node 104 may send a DEREGISTRATION_ACCEPT message to the UE 100 that includes an UNSUBSCRIBE_PLMN/NPN IE having a value of "TRUE" to indicate that the UE 100 has been unsubscribed from the one or more services.

As illustrated at 318, based on the indication received above at 316, the UE 100 may optimize the handling and may not retry registration (e.g., for a period of time). As illustrated at 320, the UDM node 108 may inform the HSS 300 that one or more other domain registrations may also be cancelled (e.g., suspended or deleted). For example, the UDM node 108 may send a HSS-UDM interface message to the HSS 300 to inform the HSS 300 that the one or more other domain registrations may be cancelled. In some embodiments, the message used to inform the HSS 300 (e.g., the HSS-UDM interface message) may include information to indicate that the one or more other domain registrations can be cancelled. The HSS 300 may deregister the UE 100 (e.g., the subscriber) in one or more other domains, if the subscription being cancelled is common across the one or more other domains.

To avoid a DoS attack (e.g., repeated and frequent attempts to dynamically subscribe and unsubscribe), the UE 100 may be barred from registering and/or subscribing for a certain period of time (e.g., one hour to 24 hours) after the dynamic unsubscribe process is complete.

As described above, FIG. 3 is provided as an example. Other examples are possible, according to some embodiments.

Figure 4:
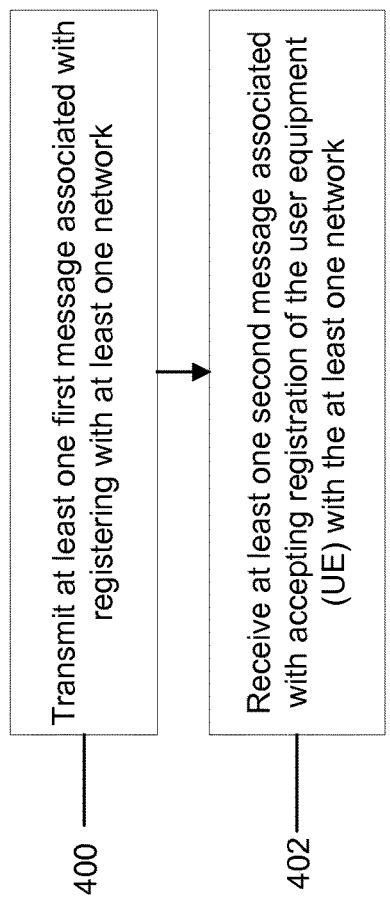
FIG. 4 illustrates an example flow diagram of a method, according to some embodiments.

FIG. 4 illustrates an example flow diagram of a method, according to some embodiments. For example, FIG. 4 shows example operations of a UE (e.g., UE 100) with respect to a registration process for registering the UE with a PLMN/NPN. Some of the operations illustrated in FIG. 4 may be similar to some operations shown in, and described with respect to, FIG. 1.

In an embodiment, the method may include, at 400, transmitting at least one first message associated with registering with at least one network. The at least one first message may include first information that indicates whether the user equipment (UE) is capable of unsubscribing from one or more services associated with the at least one network. In an embodiment, the method may include, at 402, receiving at least one second message associated with accepting registration of the user equipment (UE) with the at least one network. The at least one second message may include second information that indicates whether the user equipment (UE) is allowed to unsubscribe from the one or more services.

In some embodiments, the at least one first message may comprise at least one network access stratum (NAS) registration request message. In some embodiments, the at least one second message may comprise at least one network access stratum (NAS) registration accept message. In some embodiments, transmitting the at least one first message may comprise transmitting the at least one first message to at least one radio access network (RAN) node.

In some embodiments, receiving the at least one second message may comprise receiving the at least one second message from at least one radio access network (RAN) node. In some embodiments, the method may further comprise configuring the first information to indicate that the user equipment (UE) is capable of unsubscribing, or configuring the first information to indicate that the user equipment (UE) is not capable of unsubscribing. In some embodiments, the first information may comprise at least one first value in at least one first information element (IE) or the second information comprises at least one second value in at least one second information element (IE).

In some embodiments, configuring the first information may comprise configuring the first information by configuring the at least one first value of the at least one first information element (IE). In some embodiments, the method may further comprise storing the second information after receiving the second information, and determining to operate based on whether the second information indicates that the user equipment (UE) is allowed to unsubscribe.

As described above, FIG. 4 is provided as an example. Other examples are possible according to some embodiments.

Figure 5:
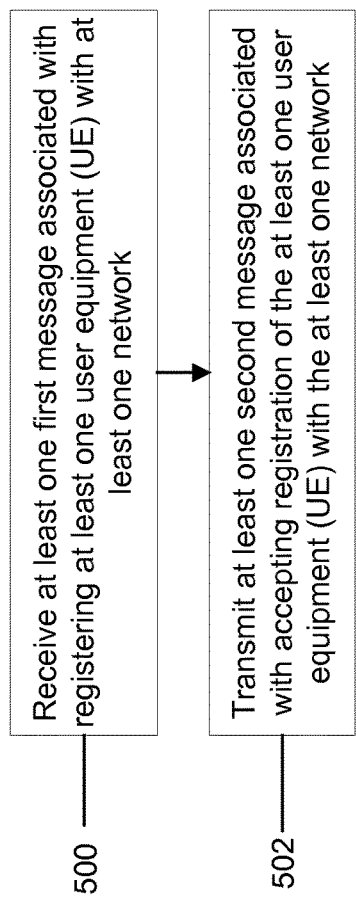
FIG. 5 illustrates an example flow diagram of a method, according to some embodiments.

FIG. 5 illustrates an example flow diagram of a method, according to some embodiments. For example, FIG. 5 shows example operations of a network node (e.g., a RAN node (e.g., a RAN node 102), an AMF node (e.g., an AMF node 104), and/or a UDM node (e.g., a UDM node 108)) with respect to a registration process for registering a user equipment (UE) with a PLMN/NPN. Some of the operations illustrated in FIG. 5 may be similar to some operations shown in, and described with respect to, FIG. 1.

In an embodiment, the method may include, at 500, receiving at least one first message associated with registering at least one user equipment (UE) with at least one network. The at least one first message may include first information that indicates whether the at least one user equipment (UE) is capable of unsubscribing from one or more services associated with the at least one network. In an embodiment, the method may include, at 502, transmitting at least one second message associated with accepting registration of the at least one user equipment (UE) with the at least one network. The at least one second message may include second information that indicates whether the at least one user equipment (UE) is allowed to unsubscribe from the one or more services.

In some embodiments, when the network node comprises a RAN node, the at least one first message may comprise at least one network access stratum (NAS) registration request message. In some embodiments, when the network node comprises a RAN node, the at least one second message may comprise at least one network access stratum (NAS) registration accept message.

In some embodiments, when the network node comprises a RAN node, the method may further comprise providing the at least one first message or the first information to at least one other network node prior to receiving the at least one second message. In some embodiments, when the network node comprises a RAN node, the at least one other network node may comprise at least one access management function (AMF) node. In some embodiments, when the network node comprises a RAN node, the first information may comprise at least one first value in at least one first information element (IE) or the second information may comprise at least one second value in at least one second information element (IE).

In some embodiments, when the network node comprises an AMF node, the method may further comprise performing at least one registration of the at least one user equipment (UE) to at least one other network node that comprises at least one unified data management (UDM) node. In some embodiments, when the network node comprises an AMF node, performing the at least one registration may comprise performing the at least one registration via at least one registration application programming interface (API).

In some embodiments, when the network node comprises an AMF node, the at least one registration application programming interface (API) may comprise at least one Nudm_UECM_Registration application programming interface (API). In some embodiments, when the network node comprises an AMF node, performing the at least one registration may comprise providing at least one third message to the at least one other network node that comprises the at least one unified data management (UDM) node. In some embodiments, when the network node comprises an AMF node, the at least one third message may comprise the first information. In some embodiments, when the network node comprises an AMF node, the method may further comprise receiving at least one fourth message that indicates that the at least one user equipment (UE) has been subscribed to the one or more services. In some embodiments, when the network node comprises an AMF node, the at least one fourth message may comprise the second information.

In some embodiments, when the network node comprises an UDM node, receiving the at least one first message may comprises receiving the at least one first message via at least one registration application programming interface (API). In some embodiments, when the network node comprises an UDM node, the at least one registration application programming interface (API) may comprise at least one Nudm_UECM_Registration application programming interface (API). In some embodiments, when the network node comprises an UDM node, the method may further comprise providing at least one third message to at least one other network node that comprises at least one user data repository (UDR) node. In some embodiments, when the network node comprises an UDM node, the at least one third message may comprise the first information.

As described above, FIG. 5 is provided as an example. Other examples are possible according to some embodiments.

Figure 6:
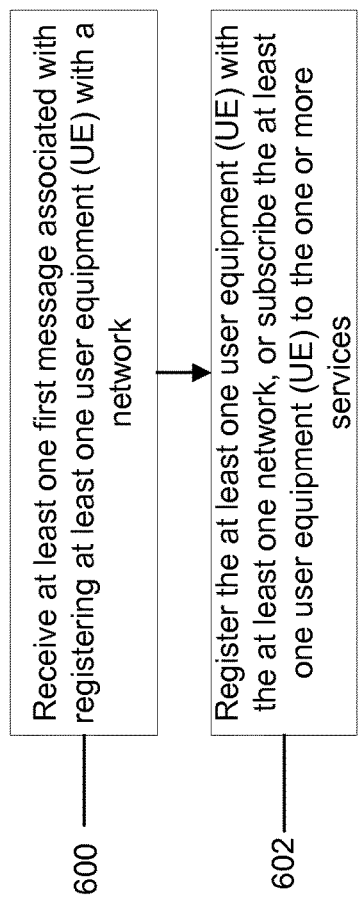
FIG. 6 illustrates an example flow diagram of a method, according to some embodiments.

FIG. 6 illustrates an example flow diagram of a method, according to some embodiments. For example, FIG. 6 shows example operations of a network node (e.g., an UDR node, such as an UDR node 110) with respect to a registration process for registering a user equipment (UE) with a PLMN/NPN. Some of the operations illustrated in FIG. 6 may be similar to some operations shown in, and described with respect to, FIG. 1.

In an embodiment, the method may include, at 600, receiving at least one first message associated with registering at least one user equipment (UE) with a network. The at least one first message may include first information that indicates whether the at least one user equipment (UE) is capable of unsubscribing from one or more services associated with the at least one network. In an embodiment, the method may include, at 602, registering the at least one user equipment (UE) with the at least one network, or subscribing the at least one user equipment (UE) to the one or more services.

In some embodiments, receiving the at least one first message may comprise receiving the at least one first message via at least one Nudr interface. In some embodiments, the method may further comprise transmitting at least one second message associated with accepting registration of the at least one user equipment (UE) with the at least one network. In some embodiments, the at least one second message may include second information that indicates whether the at least one user equipment (UE) is allowed to unsubscribe from the one or more services.

As described above, FIG. 6 is provided as an example. Other examples are possible according to some embodiments.

Figure 7:
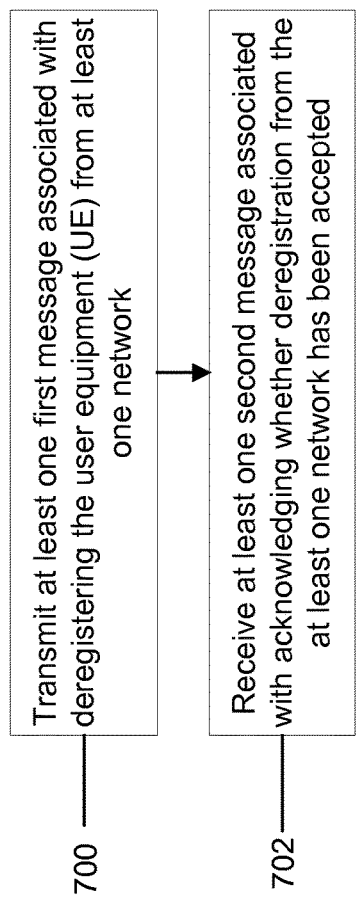
FIG. 7 illustrates an example flow diagram of a method, according to some embodiments.

FIG. 7 illustrates an example flow diagram of a method, according to some embodiments. For example, FIG. 7 shows example operations of a UE (e.g., UE 100) with respect to a captive portal-based unsubscribe process for a UE and/or a direct unsubscribe process for a UE. Some of the operations illustrated in FIG. 7 may be similar to some operations shown in, and described with respect to, FIGS. 2 and/or 3.

In an embodiment, the method may include, at 700, transmitting at least one first message associated with deregistering the user equipment (UE) from at least one network. The at least one first message may comprise first information that indicates that the at least one user equipment (UE) is requesting to unsubscribe from the one or more services. In an embodiment, the method may include, at 702, receiving at least one second message associated with acknowledging whether deregistration from the at least one network has been accepted. The at least one second message may comprise second information that indicates whether the at least one user equipment (UE) has been unsubscribed from the one or more services.

In some embodiments, the method may further comprise determining to unsubscribe from the one or more services based on satisfaction of at least one condition from a set of conditions that comprises at least one threshold battery life being satisfied, or at least one task assigned to the user equipment (UE) being completed. In some embodiments, the at least one first message may comprise at least one network access stratum (NAS) deregistration request message, or the at least one second message may comprise at least one network access stratum (NAS) deregistration accept message. In some embodiments, the first information may comprise at least one first value in at least one first information element (IE), or the second information may comprise at least one second value in at least one second information element (IE).

As described above, FIG. 7 is provided as an example. Other examples are possible according to some embodiments.

Figure 8:
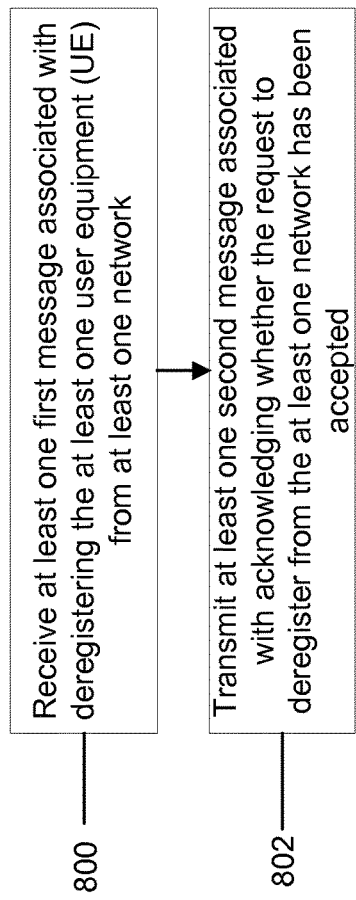
FIG. 8 illustrates an example flow diagram of a method, according to some embodiments.

FIG. 8 illustrates an example flow diagram of a method, according to some embodiments. For example, FIG. 8 shows example operations of an AMF node (e.g., an AMF node 104) with respect to a captive portal-based unsubscribe process for a UE and/or a direct unsubscribe process for a UE. Some of the operations illustrated in FIG. 8 may be similar to some operations shown in, and described with respect to, FIGS. 2 and/or 3.

In an embodiment, the method may include, at 800, receiving at least one first message associated with deregistering the at least one user equipment (UE) from at least one network. The at least one first message may comprise first information that indicates that the at least one user equipment (UE) is requesting to unsubscribe from the one or more services. In some embodiments, the method may include, at 802, transmitting at least one second message associated with acknowledging whether the request to deregister from the at least one network has been accepted. The at least one second message may comprise second information that indicates whether the user equipment (UE) has been unsubscribed from the one or more services.

In some embodiments, the method may further comprise determining whether the at least one user equipment (UE) is allowed to unsubscribe from the one or more services, and re-directing the at least one user equipment (UE) to at least one captive portal based on determining that the at least one user equipment (UE) is allowed to unsubscribe from the one or more services. In some embodiments, the method may further comprise receiving at least one indication that the at least one user equipment (UE) has been unsubscribed from the one or more services, and performing at least one deregistration of the at least one user equipment (UE). In some embodiments, the at least one first message may comprise at least one network access stratum (NAS) deregistration request message, or the at least one second message may comprise at least one network access stratum (NAS) deregistration accept message. In some embodiments, the first information may comprise at least one first value in at least one first information element (IE), or the second information may comprise at least one second value in at least one second information element (IE).

As described above, FIG. 8 is provided as an example. Other examples are possible according to some embodiments.

Figure 9:
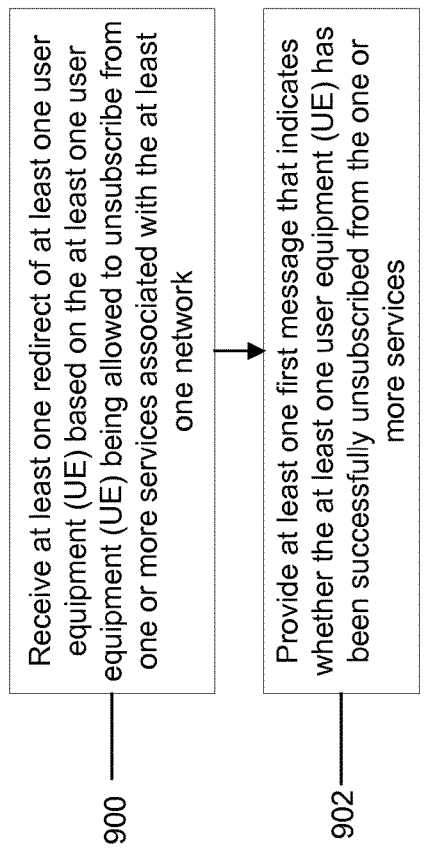
FIG. 9 illustrates an example flow diagram of a method, according to some embodiments.

FIG. 9 illustrates an example flow diagram of a method, according to some embodiments. For example, FIG. 9 shows example operations of a captive portal (e.g., captive portal 200) with respect to a captive portal-based unsubscribe process for a UE. Some of the operations illustrated in FIG. 9 may be similar to some operations shown in, and described with respect to, FIG. 2.

In an embodiment, the method may include, at 900, receiving at least one redirect of at least one user equipment (UE) based on the at least one user equipment (UE) being allowed to unsubscribe from one or more services associated with the at least one network. In some embodiments, the method may include, at 902, providing at least one first message that indicates whether the at least one user equipment (UE) has been successfully unsubscribed from the one or more services.

In some embodiments, the method may further comprise providing one or more options to the user equipment (UE) based on at least one operator policy or at least one subscription of the at least one user equipment (UE). In some embodiments, the one or more options may comprise at least one request to visit at least one location associated with at least one network operator, or at least one request to pay at least one bill.

As described above, FIG. 9 is provided as an example. Other examples are possible according to some embodiments.

Figure 10:
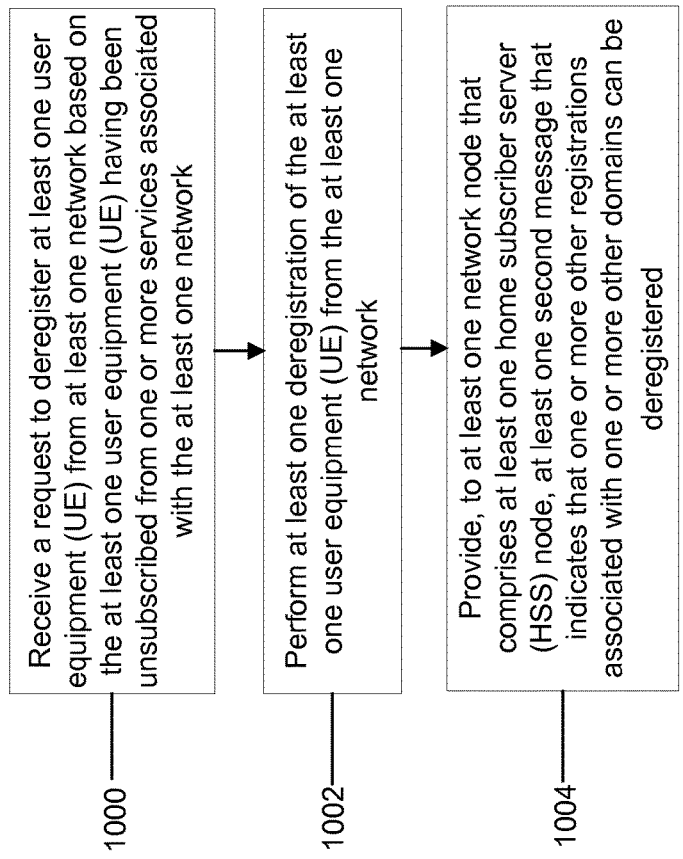
FIG. 10 illustrates an example flow diagram of a method, according to some embodiments.

FIG. 10 illustrates an example flow diagram of a method, according to some embodiments. For example, FIG. 10 shows example operations of an UDM node (e.g., an UDM node 108) with respect to a captive portal-based unsubscribe process for a UE. Some of the operations illustrated in FIG. 10 may be similar to some operations shown in, and described with respect to, FIG. 2.

In an embodiment, the method may include, at 1000, receiving a request to deregister at least one user equipment (UE) from at least one network based on the at least one user equipment (UE) having been unsubscribed from one or more services associated with the at least one network. In an embodiment, the method may include, at 1002, performing at least one deregistration of the at least one user equipment (UE) from the at least one network. In an embodiment, the method may include, at 1004, providing, to at least one network node that comprises at least one home subscriber server (HSS) node, at least one second message that indicates that one or more other registrations associated with one or more other domains can be deregistered. In some embodiments, providing the at least one second message may comprise providing the at least one second message via a HSS-UDM interface.

As described above, FIG. 10 is provided as an example. Other examples are possible according to some embodiments.

Figure 11:
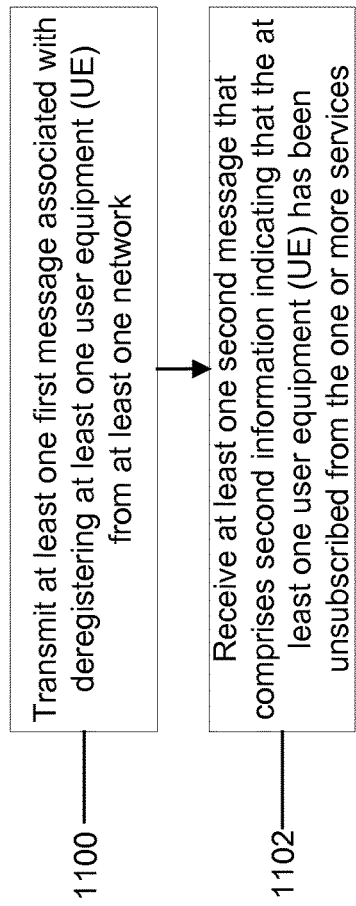
FIG. 11 illustrates an example flow diagram of a method, according to some embodiments.

FIG. 11 illustrates an example flow diagram of a method, according to some embodiments. For example, FIG. 11 shows example operations of an AMF node (e.g., an AMF node 104) with respect to a direct unsubscribe process for a UE. Some of the operations illustrated in FIG. 11 may be similar to some operations shown in, and described with respect to, FIG. 3.

In an embodiment, the method may include, at 1100, transmitting at least one first message associated with deregistering at least one user equipment (UE) from at least one network. The at least one first message may comprise first information that identifies that the at least one user equipment (UE) has requested to unsubscribe from one or more services associated with the at least one network. In some embodiments, the method may include, at 1102, receiving at least one second message that comprises second information indicating that the at least one user equipment (UE) has been unsubscribed from the one or more services.

In some embodiments, the method may further comprise receiving the at least one first message, and determining whether the at least one user equipment (UE) is allowed to unsubscribe from the one or more services. In some embodiments, the method may further comprise providing, to the at least one user equipment (UE), at least one third message associated with indicating at least one acceptance of the at least one deregistration of the at least one user equipment (UE). In some embodiments, the at least one third message may include third information that indicates that the at least one user equipment (UE) has been unsubscribed from the one or more services. In some embodiments, the first information may comprise at least one first value in at least one first information element (IE), the second information may comprise at least one second value in at least one second information element (IE), or the third information may comprise at least one third value in at least one third information element (IE). In some embodiments, the at least one first message may comprise at least one Nudm registration request message, the at least one second message may comprise at least one 200 OK message, or the at least one third message may comprise at least one network access stratum (NAS) deregistration accept message.

As described above, FIG. 11 is provided as an example. Other examples are possible according to some embodiments.

Figure 12:
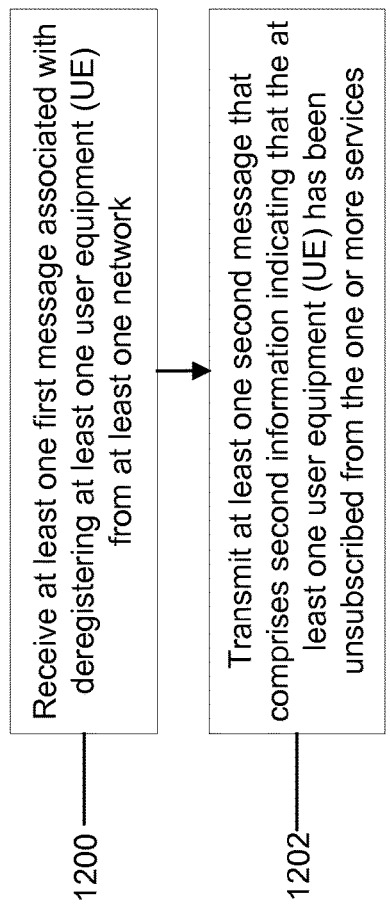
FIG. 12 illustrates an example flow diagram of a method, according to some embodiments.

FIG. 12 illustrates an example flow diagram of a method, according to some embodiments. For example, FIG. 12 shows example operations of an UDM node (e.g., an UDM node 108) with respect to a direct unsubscribe process for a UE. Some of the operations illustrated in FIG. 12 may be similar to some operations shown in, and described with respect to, FIG. 3.

In an embodiment, the method may include, at 1200, receiving at least one first message associated with deregistering at least one user equipment (UE) from at least one network. The at least one first message may comprise first information that identifies that the at least one user equipment (UE) has requested to unsubscribe from one or more services associated with the at least one network. In an embodiment, the method may include, at 1202, transmitting at least one second message that comprises second information indicating that the at least one user equipment (UE) has been unsubscribed from the one or more services.

In some embodiments, the method may further include configuring subscription information associated with the at least one user equipment (UE) to indicate that at least one subscription of the at least one user equipment (UE) has been suspended or deleted prior to transmitting the at least one second message. In some embodiments, the method may further comprise providing, to the at least one user equipment (UE), at least one third message associated with indicating at least one acceptance of the at least one deregistration of the at least one user equipment (UE). The at least one third message may include third information that indicates that the at least one user equipment (UE) has been unsubscribed from the one or more services.

In some embodiments, the first information may comprise at least one first value in at least one first information element (IE), the second information may comprise at least one second value in at least one second information element (IE), or the third information may comprise at least one third value in at least one third information element (IE). In some embodiments, the at least one first message may comprise at least one Nudm registration request message, the at least one second message may comprise at least one 200 OK message, or the at least one third message may comprise at least one network access stratum (NAS) deregistration accept message.

As described above, FIG. 12 is provided as an example. Other examples are possible according to some embodiments.

Figure 13:
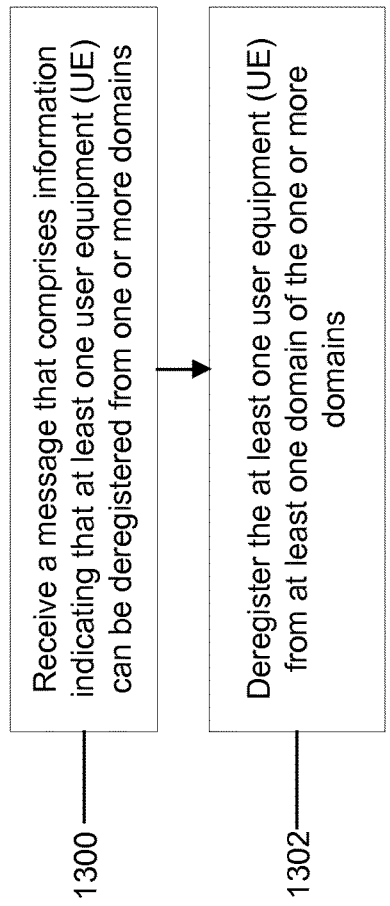
FIG. 13 illustrates an example flow diagram of a method, according to some embodiments.

FIG. 13 illustrates an example flow diagram of a method, according to some embodiments. For example, FIG. 13 shows example operations of a HSS node (e.g., a HSS node 300) with respect to a direct unsubscribe process for a UE. Some of the operations illustrated in FIG. 13 may be similar to some operations shown in, and described with respect to, FIG. 3.

In an embodiment, the method may include, at 1300, receiving a message that comprises information indicating that at least one user equipment (UE) can be deregistered from one or more domains. In an embodiment, the method may include, at 1302, deregistering the at least one user equipment (UE) from at least one domain of the one or more domains. A subscription of the UE to one or more services may be common across the one or more domains. In some embodiments, the message may be received via a HSS-UDM interface.

As described above, FIG. 13 is provided as an example. Other examples are possible according to some embodiments.

Figure 14B:
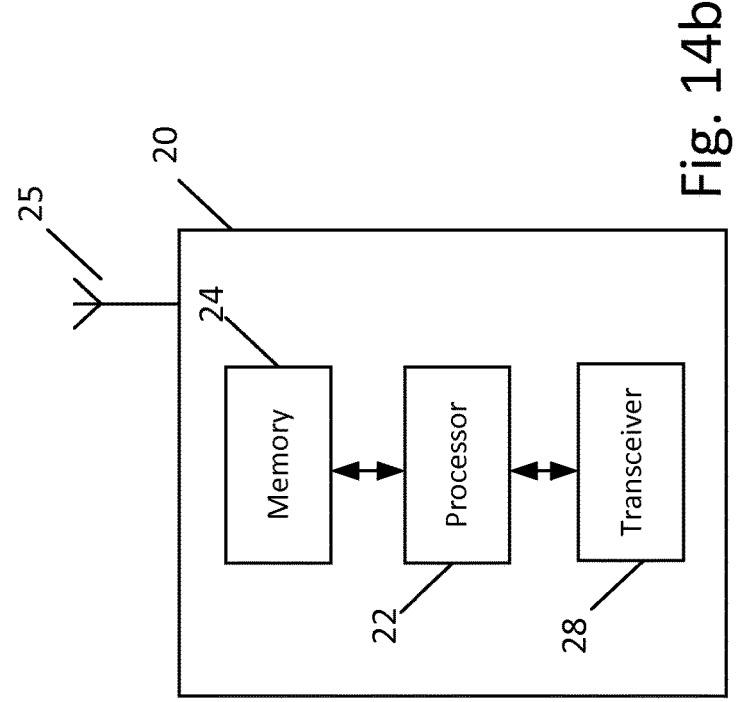
FIG. 14b illustrates an example block diagram of an apparatus, according to another embodiment.
Figure 14A:
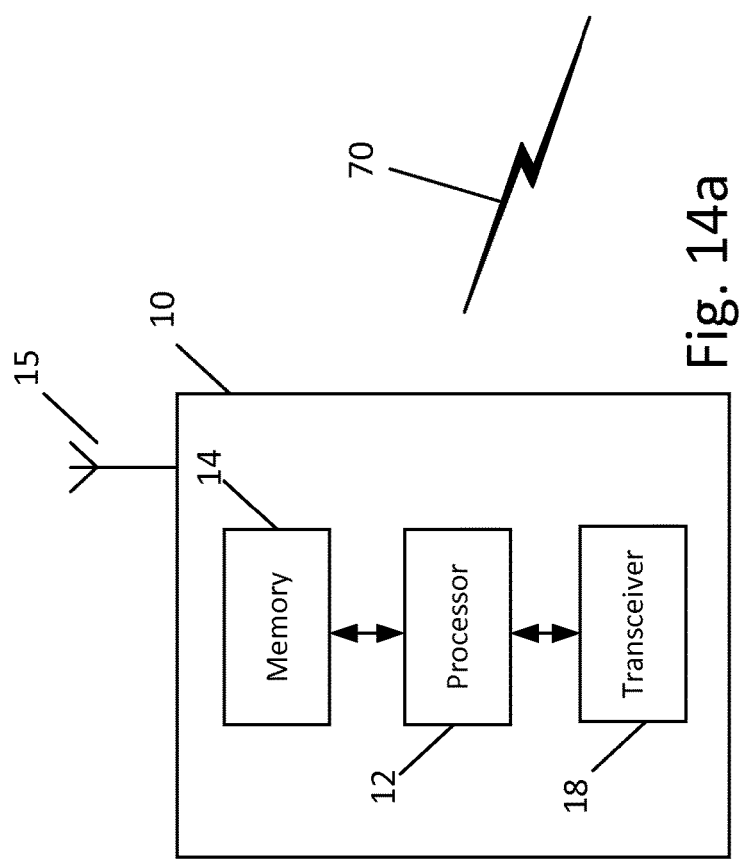
FIG. 14a illustrates an example block diagram of an apparatus, according to an embodiment.

FIG. 14a illustrates an example of an apparatus 10 according to an embodiment. In an embodiment, apparatus 10 may be a node, host, or server in a communications network or serving such a network. For example, apparatus 10 may be a network node (e.g., that comprises a RAN node, an AMF node, an AUSF node, a UDM node, a UDR node, a captive portal, a HSS, and/or the like), satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 14a.

As illustrated in the example of FIG. 14a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 14a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-13.

For instance, in one embodiment, apparatus 10 may be controlled by memory 14 and processor 12 to receive at least one first message associated with registering at least one user equipment (UE) with at least one network. The at least one first message may include first information that indicates whether the at least one user equipment (UE) is capable of unsubscribing from one or more services associated with the at least one network. In one embodiment, apparatus 10 may be controlled by memory 14 and processor 12 to transmit at least one second message associated with accepting registration of the at least one user equipment (UE) with the at least one network. The at least one second message may include second information that indicates whether the at least one user equipment (UE) is allowed to unsubscribe from the one or more services.

In one embodiment, apparatus 10 may be controlled by memory 14 and processor 12 to receive at least one first message associated with registering at least one user equipment (UE) with a network. The at least one first message may include first information that indicates whether the at least one user equipment (UE) is capable of unsubscribing from one or more services associated with the at least one network. In one embodiment, apparatus 10 may be controlled by memory 14 and processor 12 to register the at least one user equipment (UE) with the at least one network, or subscribing the at least one user equipment (UE) to the one or more services.

In one embodiment, apparatus 10 may be controlled by memory 14 and processor 12 to receive at least one first message associated with deregistering the at least one user equipment (UE) from at least one network. The at least one first message may comprise first information that indicates that the at least one user equipment (UE) is requesting to unsubscribe from the one or more services. In one embodiment, apparatus 10 may be controlled by memory 14 and processor 12 to transmit at least one second message associated with acknowledging whether the request to deregister from the at least one network has been accepted. The at least one second message may comprise second information that indicates whether the user equipment (UE) has been unsubscribed from the one or more services.

In one embodiment, apparatus 10 may be controlled by memory 14 and processor 12 to receive at least one redirect of at least one user equipment (UE) based on the at least one user equipment (UE) being allowed to unsubscribe from one or more services associated with the at least one network. In one embodiment, apparatus 10 may be controlled by memory 14 and processor 12 to provide at least one first message that indicates whether the at least one user equipment (UE) has been successfully unsubscribed from the one or more services.

In one embodiment, apparatus 10 may be controlled by memory 14 and processor 12 to receive a request to deregister at least one user equipment (UE) from at least one network based on the at least one user equipment (UE) having been unsubscribed from one or more services associated with the at least one network. In one embodiment, apparatus 10 may be controlled by memory 14 and processor 12 to perform at least one deregistration of the at least one user equipment (UE) from the at least one network. In one embodiment, apparatus 10 may be controlled by memory 14 and processor 12 to provide, to at least one network node that comprises at least one home subscriber server (HSS) node, at least one second message that indicates that one or more other registrations associated with one or more other domains can be deregistered.

In one embodiment, apparatus 10 may be controlled by memory 14 and processor 12 to transmit at least one first message associated with deregistering at least one user equipment (UE) from at least one network. The at least one first message may comprise first information that identifies that the at least one user equipment (UE) has requested to unsubscribe from one or more services associated with the at least one network. In one embodiment, apparatus 10 may be controlled by memory 14 and processor 12 to receive at least one second message that comprises second information indicating that the at least one user equipment (UE) has been unsubscribed from the one or more services.

In one embodiment, apparatus 10 may be controlled by memory 14 and processor 12 to receive at least one first message associated with deregistering at least one user equipment (UE) from at least one network. The at least one first message may comprise first information that identifies that the at least one user equipment (UE) has requested to unsubscribe from one or more services associated with the at least one network. In one embodiment, apparatus 10 may be controlled by memory 14 and processor 12 to transmit at least one second message that comprises second information indicating that the at least one user equipment (UE) has been unsubscribed from the one or more services.

In one embodiment, apparatus 10 may be controlled by memory 14 and processor 12 to receive a message that comprises information indicating that at least one user equipment (UE) can be deregistered from one or more domains. I In one embodiment, apparatus 10 may be controlled by memory 14 and processor 12 to deregister the at least one user equipment (UE) from at least one domain of the one or more domains. A subscription of the UE to one or more services may be common across the one or more domains.

FIG. 14b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. For example, although some embodiments are described in the context of a 5G network via use of an AMF node, a UDM node, and/or the like, certain embodiments apply equally to a 4G network, a 3G network, a 2G network, and/or the like. Continuing with the previous example, for a 4G network, certain embodiments described herein may use a MME node rather than an AMF node, may use a HSS node rather than a UDM node, and/or the like. It should be noted that one of ordinary skill in the art would understand that apparatus 20 may include components or features not shown in FIG. 14b.

As illustrated in the example of FIG. 14b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 14b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-13.

For instance, in one embodiment, apparatus 20 may be controlled by memory 24 and processor 22 to transmit at least one first message associated with registering with at least one network. The at least one first message may include first information that indicates whether the user equipment (UE) is capable of unsubscribing from one or more services associated with the at least one network. in one embodiment, apparatus 20 may be controlled by memory 24 and processor 22 to receive at least one second message associated with accepting registration of the user equipment (UE) with the at least one network. The at least one second message may include second information that indicates whether the user equipment (UE) is allowed to unsubscribe from the one or more services.

In one embodiment, apparatus 20 may be controlled by memory 24 and processor 22 to transmit at least one first message associated with deregistering the user equipment (UE) from at least one network. The at least one first message may comprise first information that indicates that the at least one user equipment (UE) is requesting to unsubscribe from the one or more services. In one embodiment, apparatus 20 may be controlled by memory 24 and processor 22 to receive at least one second message associated with acknowledging whether deregistration from the at least one network has been accepted. The at least one second message may comprise second information that indicates whether the at least one user equipment (UE) has been unsubscribed from the one or more services.

Therefore, certain example embodiments provide several technological improvements, enhancements, and/or advantages over existing technological processes. For example, one benefit of some example embodiments is an ability to conserve computing and/or processor resources of a UE and/or a network node, or to reduce signaling between the UE and the network node, for example, by allowing a UE to dynamically unsubscribe from one or more services provided by a network based on satisfaction of one or more conditions. Accordingly, the use of some example embodiments results in improved functioning of communications networks and their nodes and, therefore constitute an improvement at least to the technological field of network subscription management, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include transmitting at least one first message associated with registering with at least one network. The at least one first message may include first information that indicates whether the user equipment (UE) is capable of unsubscribing from one or more services associated with the at least one network. In an embodiment, the method may include receiving at least one second message associated with accepting registration of the user equipment (UE) with the at least one network. The at least one second message may include second information that indicates whether the user equipment (UE) is allowed to unsubscribe from the one or more services.

In a variant, the at least one first message may comprise at least one network access stratum (NAS) registration request message. In a variant, the at least one second message may comprise at least one network access stratum (NAS) registration accept message. In a variant, transmitting the at least one first message may comprise transmitting the at least one first message to at least one radio access network (RAN) node.

In a variant, receiving the at least one second message may comprise receiving the at least one second message from at least one radio access network (RAN) node. In a variant, the method may further comprise configuring the first information to indicate that the user equipment (UE) is capable of unsubscribing, or configuring the first information to indicate that the user equipment (UE) is not capable of unsubscribing. In a variant, the first information may comprise at least one first value in at least one first information element (IE) or the second information comprises at least one second value in at least one second information element (IE).

In a variant, configuring the first information may comprise configuring the first information by configuring the at least one first value of the at least one first information element (IE). In a variant, the method may further comprise storing the second information after receiving the second information, and determining to operate based on whether the second information indicates that the user equipment (UE) is allowed to unsubscribe.

According to a second embodiment, a method may include receiving at least one first message associated with registering at least one user equipment (UE) with at least one network. The at least one first message may include first information that indicates whether the at least one user equipment (UE) is capable of unsubscribing from one or more services associated with the at least one network. In an embodiment, the method may include transmitting at least one second message associated with accepting registration of the at least one user equipment (UE) with the at least one network. The at least one second message may include second information that indicates whether the at least one user equipment (UE) is allowed to unsubscribe from the one or more services.

In a variant, when the network node comprises a RAN node, the at least one first message may comprise at least one network access stratum (NAS) registration request message. In a variant, when the network node comprises a RAN node, the at least one second message may comprise at least one network access stratum (NAS) registration accept message.

In a variant, when the network node comprises a RAN node, the method may further comprise providing the at least one first message or the first information to at least one other network node prior to receiving the at least one second message. In a variant, when the network node comprises a RAN node, the at least one other network node may comprise at least one access management function (AMF) node. In a variant, when the network node comprises a RAN node, the first information may comprise at least one first value in at least one first information element (IE) or the second information comprises at least one second value in at least one second information element (IE).

In a variant, when the network node comprises a AMF node, the method may further comprise performing at least one registration of the at least one user equipment (UE) to at least one other network node that comprises at least one unified data management (UDM) node. In a variant, when the network node comprises a AMF node, performing the at least one registration may comprise performing the at least one registration via at least one registration application programming interface (API).

In a variant, when the network node comprises a AMF node, the at least one registration application programming interface (API) may comprise at least one Nudm_UECM_Registration application programming interface (API). In a variant, when the network node comprises a AMF node, performing the at least one registration may comprise providing at least one third message to the at least one other network node that comprises the at least one unified data management (UDM) node. In a variant, when the network node comprises a AMF node, the at least one third message may comprise the first information. In a variant, when the network node comprises a AMF node, the method may further comprise receiving at least one fourth message that indicates that the at least one user equipment (UE) has been subscribed to the one or more services. In a variant, when the network node comprises a AMF node, the at least one fourth message may comprise the second information.

In a variant, when the network node comprises a UDM node, receiving the at least one first message may comprises receiving the at least one first message via at least one registration application programming interface (API). In a variant, when the network node comprises a UDM node, the at least one registration application programming interface (API) comprises at least one Nudm_UECM_Registration application programming interface (API). In a variant, when the network node comprises a UDM node, the method may further comprise providing at least one third message to at least one other network node that comprises at least one user data repository (UDR) node. In a variant, when the network node comprises a UDM node, the at least one third message may comprise the first information.

According to a third embodiment, a method may include receiving at least one first message associated with registering at least one user equipment (UE) with a network. The at least one first message may include first information that indicates whether the at least one user equipment (UE) is capable of unsubscribing from one or more services associated with the at least one network. In an embodiment, the method may include registering the at least one user equipment (UE) with the at least one network, or subscribing the at least one user equipment (UE) to the one or more services.

In a variant, receiving the at least one first message may comprise receiving the at least one first message via at least one Nudr interface. In a variant, the method may further comprise transmitting at least one second message associated with accepting registration of the at least one user equipment (UE) with the at least one network. In a variant, the at least one second message may include second information that indicates whether the at least one user equipment (UE) is allowed to unsubscribe from the one or more services.

According to a fourth embodiment, a method may include transmitting at least one first message associated with deregistering the user equipment (UE) from at least one network. The at least one first message may comprise first information that indicates that the at least one user equipment (UE) is requesting to unsubscribe from the one or more services. In an embodiment, the method may include receiving at least one second message associated with acknowledging whether deregistration from the at least one network has been accepted. The at least one second message may comprise second information that indicates whether the at least one user equipment (UE) has been unsubscribed from the one or more services.

In a variant, the method may further comprise determining to unsubscribe from the one or more services based on satisfaction of at least one condition from a set of conditions that comprises at least one threshold battery life being satisfied, or at least one task assigned to the user equipment (UE) being completed. In a variant, the at least one first message may comprise at least one network access stratum (NAS) deregistration request message, or the at least one second message may comprise at least one network access stratum (NAS) deregistration accept message. In a variant, the first information may comprise at least one first value in at least one first information element (IE), or the second information may comprise at least one second value in at least one second information element (IE).

According to a fifth embodiment, a method may include receiving at least one first message associated with deregistering the at least one user equipment (UE) from at least one network. The at least one first message may comprise first information that indicates that the at least one user equipment (UE) is requesting to unsubscribe from the one or more services. In an embodiment, the method may include transmitting at least one second message associated with acknowledging whether the request to deregister from the at least one network has been accepted. The at least one second message may comprise second information that indicates whether the user equipment (UE) has been unsubscribed from the one or more services.

In a variant, the method may further comprise determining whether the at least one user equipment (UE) is allowed to unsubscribe from the one or more services, and re-directing the at least one user equipment (UE) to at least one captive portal based on determining that the at least one user equipment (UE) is allowed to unsubscribe from the one or more services. In a variant, the method may further comprise receiving at least one indication that the at least one user equipment (UE) has been unsubscribed from the one or more services, and performing at least one deregistration of the at least one user equipment (UE). In a variant, the at least one first message may comprise at least one network access stratum (NAS) deregistration request message, or the at least one second message may comprise at least one network access stratum (NAS) deregistration accept message. In a variant, the first information may comprise at least one first value in at least one first information element (IE), or the second information may comprise at least one second value in at least one second information element (IE).

According to a sixth embodiment, a method may include receiving at least one redirect of at least one user equipment (UE) based on the at least one user equipment (UE) being allowed to unsubscribe from one or more services associated with the at least one network. In an embodiment, the method may include providing at least one first message that indicates whether the at least one user equipment (UE) has been successfully unsubscribed from the one or more services.

In a variant, the method may further comprise providing one or more options to the user equipment (UE) based on at least one operator policy or at least one subscription of the at least one user equipment (UE). In a variant, the one or more options may comprise at least one request to visit at least one location associated with at least one network operator, or at least one request to pay at least one bill.

According to a seventh embodiment, a method may include receiving a request to deregister at least one user equipment (UE) from at least one network based on the at least one user equipment (UE) having been unsubscribed from one or more services associated with the at least one network. In an embodiment, the method may include performing at least one deregistration of the at least one user equipment (UE) from the at least one network. In an embodiment, the method may include providing, to at least one network node that comprises at least one home subscriber server (HSS) node, at least one second message that indicates that one or more other registrations associated with one or more other domains can be deregistered. In a variant, providing the at least one second message may comprise providing the at least one second message via a HSS-UDM interface.

According to an eighth embodiment, a method may include transmitting at least one first message associated with deregistering at least one user equipment (UE) from at least one network. The at least one first message may comprise first information that identifies that the at least one user equipment (UE) has requested to unsubscribe from one or more services associated with the at least one network. In an embodiment, the method may include receiving at least one second message that comprises second information indicating that the at least one user equipment (UE) has been unsubscribed from the one or more services.

In a variant, the method may further comprise receiving the at least one first message, and determining whether the at least one user equipment (UE) is allowed to unsubscribe from the one or more services. In a variant, the method may further comprise providing, to the at least one user equipment (UE), at least one third message associated with indicating at least one acceptance of the at least one deregistration of the at least one user equipment (UE). In a variant, the at least one third message may include third information that indicates that the at least one user equipment (UE) has been unsubscribed from the one or more services. In a variant, the first information may comprise at least one first value in at least one first information element (IE), the second information may comprise at least one second value in at least one second information element (IE), or the third information may comprise at least one third value in at least one third information element (IE). In a variant, the at least one first message may comprise at least one Nudm registration request message, the at least one second message may comprise at least one 200 OK message, or the at least one third message may comprise at least one network access stratum (NAS) deregistration accept message.

According to a ninth embodiment, a method may include receiving at least one first message associated with deregistering at least one user equipment (UE) from at least one network. The at least one first message may comprise first information that identifies that the at least one user equipment (UE) has requested to unsubscribe from one or more services associated with the at least one network. In an embodiment, the method may include transmitting at least one second message that comprises second information indicating that the at least one user equipment (UE) has been unsubscribed from the one or more services.

In a variant, the method may further include configuring subscription information associated with the at least one user equipment (UE) to indicate that at least one subscription of the at least one user equipment (UE) has been suspended or deleted prior to transmitting the at least one second message. In a variant, the method may further comprise providing, to the at least one user equipment (UE), at least one third message associated with indicating at least one acceptance of the at least one deregistration of the at least one user equipment (UE). The at least one third message may include third information that indicates that the at least one user equipment (UE) has been unsubscribed from the one or more services.

In a variant, the first information may comprise at least one first value in at least one first information element (IE), the second information may comprise at least one second value in at least one second information element (IE), or the third information may comprise at least one third value in at least one third information element (IE). In a variant, the at least one first message may comprise at least one Nudm registration request message, the at least one second message may comprise at least one 200 OK message, or the at least one third message may comprise at least one network access stratum (NAS) deregistration accept message.

According to a tenth embodiment, a method may include receiving a message that comprises information indicating that at least one user equipment (UE) can be deregistered from one or more domains. In an embodiment, the method may include deregistering the at least one user equipment (UE) from at least one domain of the one or more domains. A subscription of the UE to one or more services may be common across the one or more domains. In a variant, the message may be received via a HSS-UDM interface.

An eleventh embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

A twelfth embodiment may be directed to an apparatus that may include circuitry configured to perform the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

A thirteenth embodiment may be directed to an apparatus that may include means for performing the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

A fourteenth embodiment may be directed to a computer readable medium comprising program instructions stored thereon for performing at least the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

An fifteenth embodiment may be directed to a computer program product encoding instructions for performing at least the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

The invention claimed is:

1. A method, comprising:
   determining, by a user equipment, to unsubscribe to one or more services provided by a network based on a satisfaction of a condition;
   transmitting, by a user equipment to an access and mobility function of the network, a deregistration request message,
   the deregistration request message comprising first information that indicates that the user equipment is requesting to unsubscribe from the one or more services provided by the network; and
   receiving, by the user equipment from the access and mobility function, a deregistration accept message,
   comprising second information that indicates that the user equipment has been unsubscribed from the one or more services provided by the network.

2. The method of claim 1, wherein satisfaction of the condition comprises a threshold value for a battery life of the user equipment has been satisfied or detection or receipt of an indication that a task assigned to the user equipment has been satisfied.

3. A method, comprising:
   receiving, by an access and mobility function of a network, a deregistration request message from a user equipment, the deregistration request message including first information that indicates that the user equipment has requested to unsubscribe from one or more services provided by the network;
   based on determining that the user equipment is allowed to unsubscribe to the one or more services of the network, transmitting, by the access and mobility function, the deregistration request message to a network node of the network;
   receiving, by the access and mobility management function from the network node, a message indicating that the user equipment has been successfully unsubscribed from the one or more services provided by the network; and
   transmitting, by the access and mobility management function to the user equipment, a deregistration accept message comprising second information indicating that the user equipment has been unsubscribed from the one or more services provided by the network.

4. The method according to claim 3, further comprising:
   receiving, by the access and mobility function, a registration request message from the user equipment, the registration request comprising third information indicating that the user equipment is capable of unsubscribing from one or more services of the network; and
   determining that the user equipment is allowed to unsubscribe from the one or more services of the network based on the third information.

5. The method of claim 3, wherein the determining comprises determining that the user equipment is allowed to unsubscribe to the one or more services of the network based on subscriber data associated with the user equipment.

6. The method according to claim 3, wherein the network node is a captive portal or a unified data management node.

7. The method according to claim 3, wherein the first information comprises a first value in a first information element in the deregistration request message, the first value indicating that the user equipment has requested to unsubscribe from one or more services of the network, and wherein the second information comprises a second value in a second information element in the deregistration accept message, the second value indicating that the user equipment has been unsubscribed from the one or more services of the network.

8. The method according to claim 3, wherein the message indicating that the has been successfully unsubscribed from the one or more services of the network comprises a 200 OK message.

9. A method, comprising:
   receiving, by a captive portal of a network from an access and mobility function of the network, a deregistration request message, comprising first information that indicates that a user equipment has requested to unsubscribe from one or more services provided by the network; and
   transmitting, by the captive portal to the access and mobility function, a message indicating that the user equipment has been unsubscribed from the one or more services provided by the network.

10. The method according to claim 9, further comprising:
    configuring, by the captive portal to the access and mobility function, subscription information associated with the user equipment stored in a unified data management node, wherein the configuring comprises indicating in the subscription information that a subscription of the user equipment has been suspended or deleted.

11. The method according to claim 9, further comprising:
    providing, to the at least one user equipment, a second message associated with indicating at least one acceptance of the at least one deregistration of the user equipment, wherein the second message includes information that indicates that the user equipment has been unsubscribed from the one or more services.

12. The method according to claim 9, wherein the first information comprises a first value in a first information element in the deregistration request message, the first value indicating that a user equipment has requested to unsubscribe from one or more services provided by the network.

13. The method according to claim 9, wherein the message comprises at least one 200 OK message.

14. A user equipment comprising:
    at least one processor; and
    at least one memory including computer program code,
    wherein the computer program code is configured to, when executed by the at least one processor, cause the user equipment to perform at least:

determining to unsubscribe to one or more services provided by a network based on a satisfaction of a condition;

transmitting a deregistration request message to an access and mobility function of the network, the deregistration request message comprising first information that indicates that the user equipment has requested to unsubscribe from one or more services provided by the network; and receiving from the access and mobility function a deregistration accept message comprising second information indicating that the user equipment has been unsubscribed from the one or more services provided by the network.

15. The user equipment of claim 14, wherein satisfaction of the condition comprises a threshold value for a battery life of the user equipment has been satisfied or detection or receipt of an indication that a task assigned to the user equipment has been satisfied.

16. An apparatus, comprising:

at least one processor; and at least one memory including computer program code of an access and mobility function, wherein the computer program code is configured to, when executed by the at least one processor, cause the apparatus to perform at least:

receiving, a deregistration request message including first information that indicates that a user equipment has requested to unsubscribe from one or more services provided by the network;

transmitting, to a network node, the deregistration request message;

receiving a deregistration request message from a user equipment, the deregistration request message comprising first information that indicates that the user equipment has requested to unsubscribe from one or more services provided by network;

based on determining that the user equipment is allowed to unsubscribe to the one or more services of the network, transmitting a message indicating that the user equipment has been unsubscribed from the one or more services provided by the network; and transmitting to the user equipment, a deregistration accept message comprising second information indicating that the user equipment has been unsubscribed from the one or more services provided by the network.

17. The apparatus according to claim 16, wherein the computer program code is configured to, when executed by the at least one processor, cause the apparatus to further perform at least:

receiving, by the access and mobility function, a registration request message from the user equipment, the registration request comprising third information indicating that the user equipment is capable of unsubscribing from one or more services of the network; and determining that the user equipment is allowed to unsubscribe from the one or more services of the network based on the third information.

18. The apparatus according to claim 16, wherein the network node is a captive portal or a unified data management node.

19. The apparatus according to claim 16, wherein the first information comprises a first value in a first information element in the deregistration request message, the first value indicating that the user equipment has requested to unsubscribe from one or more services of the network, and wherein the second information comprises a second value in a second information element in the deregistration accept message, the second value indicating that the user equipment has been unsubscribed from the one or more services of the network.

20. The apparatus according to claim 16, wherein the message indicating that the has been successfully unsubscribed from the one or more services of the network comprises a 200 OK message.

* * * * *